(12) United States Patent
Hodak et al.

(10) Patent No.: US 10,603,628 B2
(45) Date of Patent: Mar. 31, 2020

(54) COOLING METHANOL VAPOUR CHAMBER FOR FUEL GAS

(71) Applicants: Ryan D. Hodak, Bonanza (CA); Kirk D. Rude, Spirit River (CA)

(72) Inventors: Ryan D. Hodak, Bonanza (CA); Kirk D. Rude, Spirit River (CA)

(73) Assignee: Krude Innovations Ltd, Bonanza (CA)

( * ) Notice: Subject to any disclaimer, the term of this patent is extended or adjusted under 35 U.S.C. 154(b) by 224 days.

(21) Appl. No.: 15/881,460

(22) Filed: Jan. 26, 2018

(65) Prior Publication Data

US 2018/0214818 A1 Aug. 2, 2018

Related U.S. Application Data

(60) Provisional application No. 62/453,819, filed on Feb. 2, 2017.

(51) Int. Cl.
| | |
|---|---|
| *B01D 53/02* | (2006.01) |
| *B01D 53/26* | (2006.01) |
| *B01D 53/04* | (2006.01) |
| *F28C 3/06* | (2006.01) |
| *F28B 3/06* | (2006.01) |
| *B01D 53/18* | (2006.01) |

(52) U.S. Cl.
CPC ....... *B01D 53/265* (2013.01); *B01D 53/0438* (2013.01); *B01D 53/18* (2013.01); *F28B 3/06* (2013.01); *F28C 3/06* (2013.01); *B01D 2252/2021* (2013.01); *B01D 2256/24* (2013.01); *B01D 2257/80* (2013.01)

(58) Field of Classification Search
CPC ........ B01D 2252/2021; B01D 2256/24; B01D 2257/80; B01D 53/0438; B01D 53/18; B01D 53/265; F28B 3/06; F28C 3/06
See application file for complete search history.

(56) References Cited

U.S. PATENT DOCUMENTS

| | | | | | |
|---|---|---|---|---|---|
| 2,038,369 | A | * | 4/1936 | Lege | C10G 17/06 208/7 |
| 2,700,016 | A | * | 1/1955 | Naumann | C10G 7/00 208/7 |
| 2009/0318572 | A1 | * | 12/2009 | Sakai | C10G 2/32 518/700 |

FOREIGN PATENT DOCUMENTS

CA 2882509 C 7/2017

OTHER PUBLICATIONS

CIPO, Office action dated Oct. 24, 2016 in the counterpart Canadian patent application No. 2,882,509.

\* cited by examiner

*Primary Examiner* — Christopher P Jones
(74) *Attorney, Agent, or Firm* — ATMAC Patent Services Ltd.; Andrew T. MacMillan

(57) ABSTRACT

A fuel gas cooling chamber includes a housing body and a fuel gas inlet is provided on the housing body. The fuel gas inlet couples to a fuel gas source, and a downspout is coupled to the fuel gas inlet. The downspout directs fuel gas received from the fuel gas source via the fuel gas inlet into a methanol bath contained within the housing body. A fuel gas outlet on the housing body above a maximum level of the methanol bath allows gas vapours that come from the methanol bath to vent out of the housing body.

6 Claims, 3 Drawing Sheets

COOLING METHANOL VAPOUR CHAMBER FOR FUEL GAS

CROSS-REFERENCE TO RELATED APPLICATIONS

This application claims the benefit of priority of U.S. Provisional Application No. 62/453,819 filed Feb. 2, 2017, which is incorporated herein by reference.

BACKGROUND OF THE INVENTION

(1) Field of the Invention

The invention pertains generally to improving fuel gas quality in the oil and gas industry, primarily in the colder climates.

(2) Description of the Related Art

Fuel gas freezing up, and or hydrates in the fuel gas systems continues to be an ongoing problem within the oil and gas industry and plagues companies with the high costs involved to repair/unthaw lines once frozen, and the lost production revenues while the site is down.

BRIEF DESCRIPTION OF THE DRAWINGS

The invention will be described in greater detail with reference to the accompanying drawings.

BRIEF SUMMARY OF THE INVENTION

Figure 1:
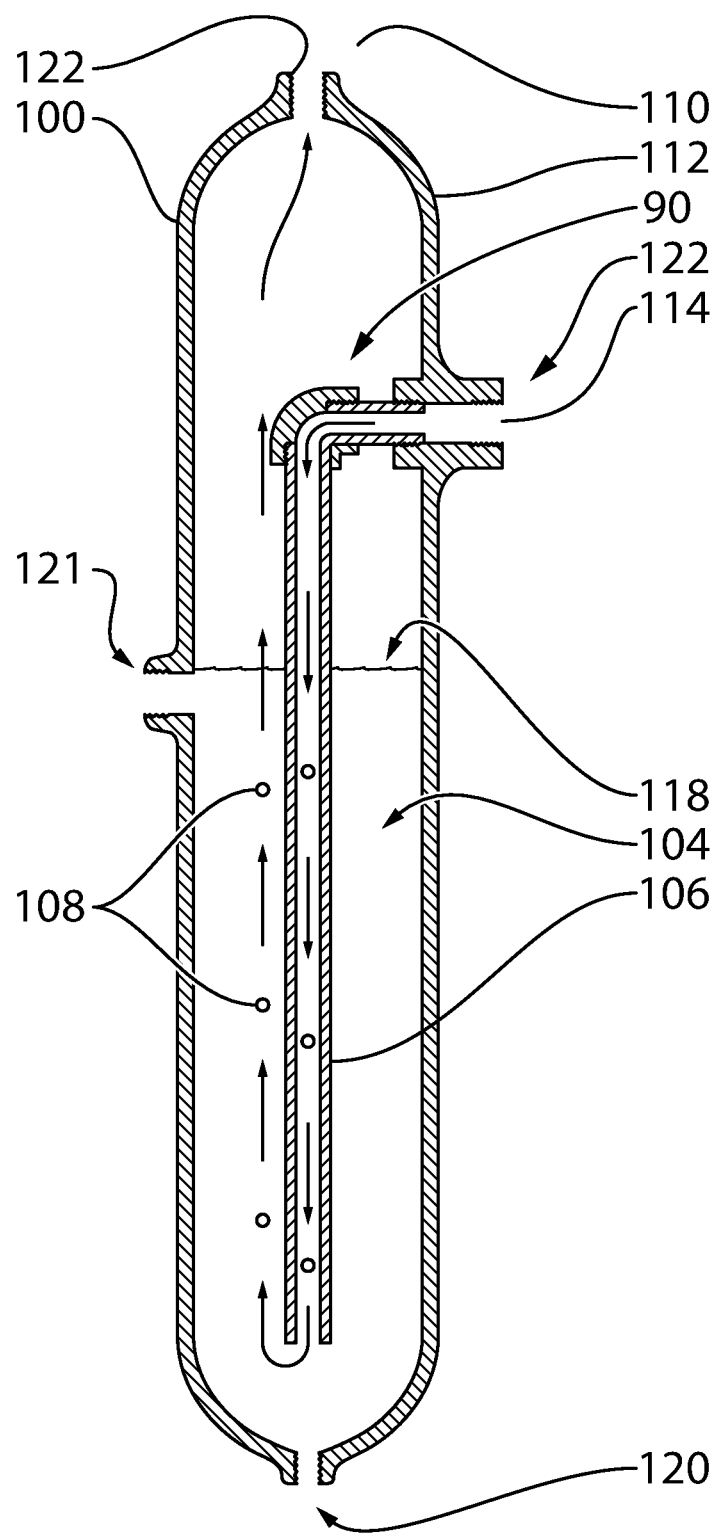
FIG. 1 illustrates a cross section of a cooling methanol vapour (CMV) chamber according to an exemplary embodiment.

According to an exemplary embodiment of the invention there is disclosed a gas cooling chamber including a housing body and a fuel gas inlet on the housing body. The fuel gas inlet is coupled to a gas source. A downspout is coupled to the fuel gas inlet, the downspout directing gas received from the gas source via the fuel gas inlet into a methanol bath contained within the housing body. A fuel gas outlet is provided on the housing body above a maximum level of the methanol bath, the fuel gas outlet allowing gas vapours that come from the methanol bath to vent out of the housing body.

According to an exemplary embodiment of the invention there is disclosed a method of pre-cooling gas. The method includes providing a methanol bath contained within a gas cooling chamber; receiving incoming gas from a gas source at a gas inlet on the gas chamber; directing the incoming gas into the methanol bath within the gas cooling chamber; and directing gas vapours that come from the methanol bath to vent out of the gas cooling chamber via a fuel gas outlet.

These and other advantages and embodiments of the present invention will no doubt become apparent to those of ordinary skill in the art after reading the following detailed description of preferred embodiments illustrated in the various figures and drawings.

DETAILED DESCRIPTION

We have spent several years developing the cooling methanol vapour (CMV) chamber and starting testing three years ago on a location where the product tank heaters would not stay operational, due to fuel gas lines freezing. The site we tested the CMV chamber on could not keep the tank heaters going for 24 hrs without freezing off, even though the fuel gas was run through gas scrubbers, and coalescent filtration.

After installing the CMV chamber, the heaters remained operational through the next 4 months, problem free. We removed the CMV chamber during the summer months, to protect the concept from being reviewed by other workers. The test location was operated by us and therefore we were able to ensure the unit was not viewed by other workers.

As we saw an immediate success with the CMV chamber we decided to further test the unit, and re-installed a revised (larger) CMV chamber on the same location the following winter. The difference this time was we ran all heat trace systems, tank heaters, and a pumpjack from the CMV chamber. This site was very prone to fuel gas freezing off to the driver, due to the long fuel gas line that ran to the pumpjack. The pumpjack was located at a remote site, which is the reason for the long fuel gas line.

Historical data from the well proved that there was a high average of downtime during the winter months, all from fuel gas freezing issues. Steamer bills were in excess of $4000 per month, plus man power for overtime, and an average loss of production of 10 m3 of oil per month for an average of 5 months per year. The loss production with an average of $60 netback per bbl, was $3600 per month, or $18,000 annual revenue loss.

We installed the CMV chamber at the beginning of December, and left the gas flowing through the CMV chamber for the duration of that winter. We had a 100% runtime, and not once did the site go down as a result of fuel gas issues. We modified the unit further and ran it the following winter as well with the same excellent results, however the modifications reduced the amount of maintenance on the unit, and made it easier, more user friendly for the well operators. The CMV chamber has been removed from the location to protect the integrity of the invention and to ensure it was not going to be viewed by others. Other than the inventor/co-inventor, there was only one site operator that was involved in the testing, and he agreed to and signed a confidentiality agreement. It was important to include him in the testing of the unit so we could get an unbiased opinion of the CMV chamber.

How it Works:

CMV stands for: Cooling, Methanol Vapour chamber.

Figure 2:
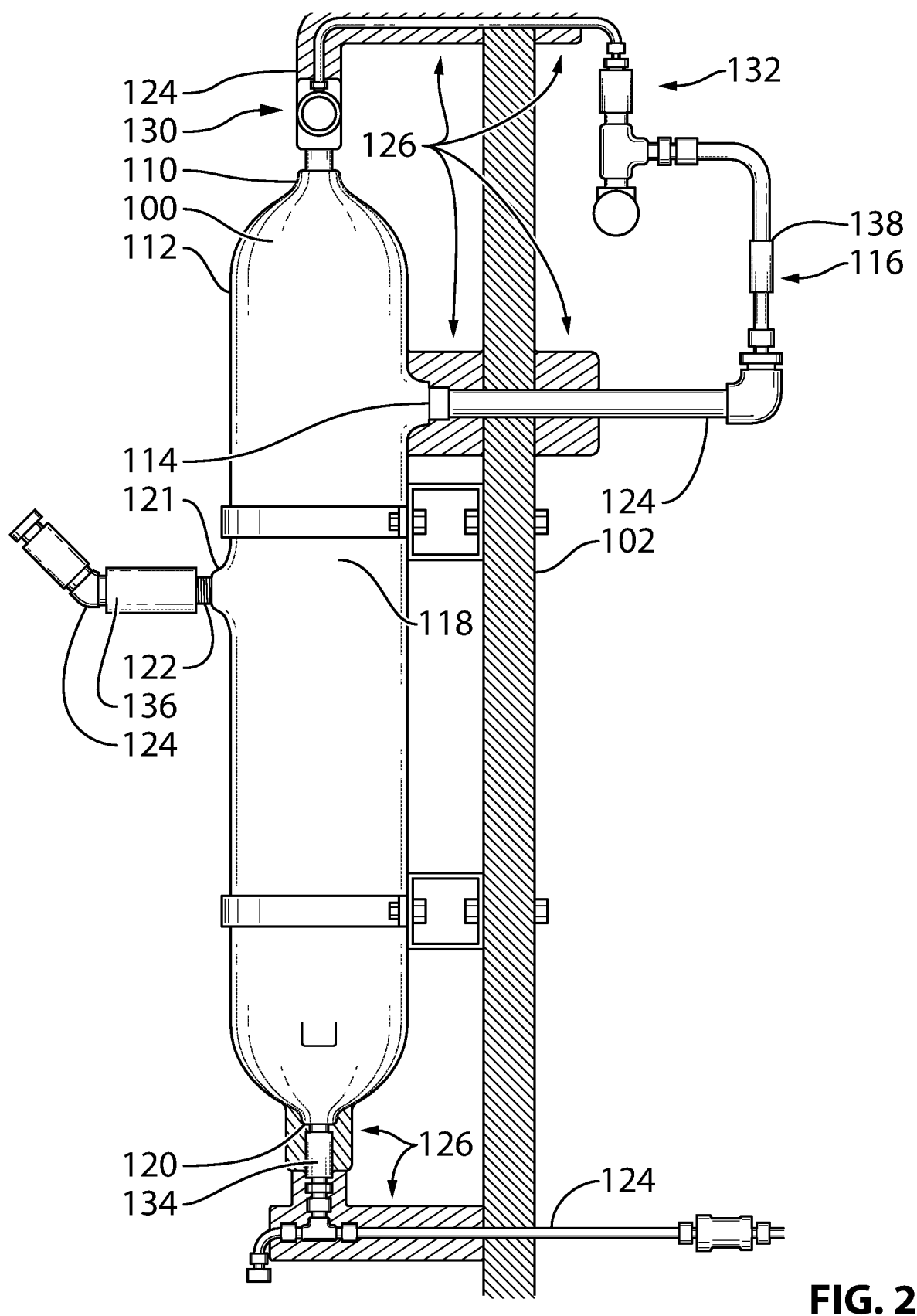
FIG. 2 illustrates a first side view of the CMV chamber of FIG. 1.
Figure 3:
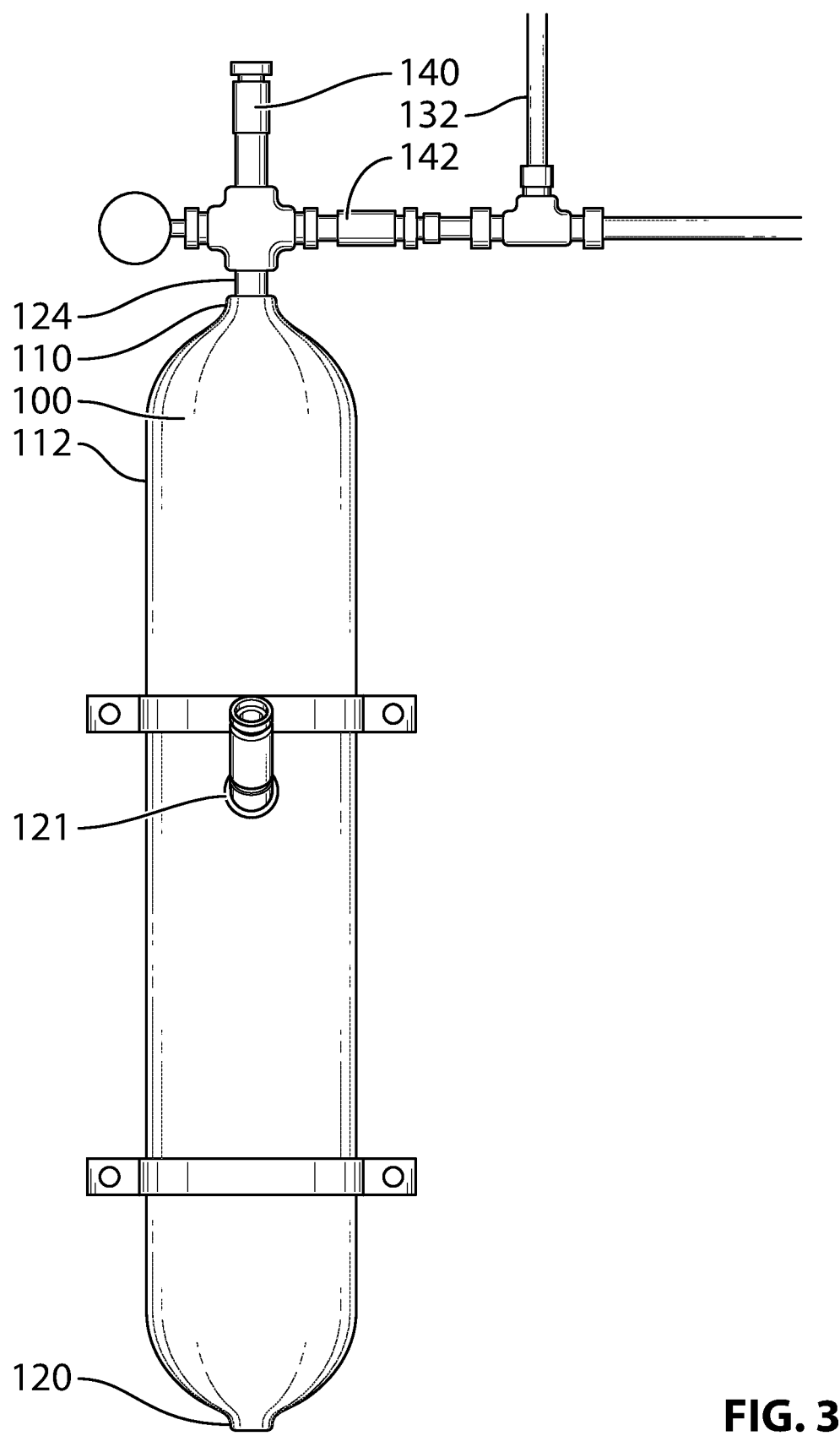
FIG. 3 illustrates a second side view of the CMV chamber of FIG. 1.

FIG. 1, FIG. 2, and FIG. 3 are schematics that show the CMV chamber 100 in detail. The gas comes into the CMV chamber 100 downstream of an existing fuel gas scrubber. The CMV chamber 100 gets mounted outside of the building wall 102, which helps in the cooling of the gas. The concept of this is to pre-cool the gas so there is not such a drastic temperature drop from the fuel gas scrubber to the item the gas is operating. One of the leading causes of hydrates is pressure and temperature changes. By pre-cooling the fuel gas helps reduce the chances of freezing. The gas goes into the CMV chamber 100 and is re-directed directly into the methanol 104 in the CMV chamber 100, there is a downspout 106 that directs the gas into the methanol 104. The methanol 104 helps strip further impurities ("wetness") from the gas that may have resulted from the cooling process. The methanol gas vapours 108 that come from the methanol bath 104, now can vent out the top 110 of the CMV chamber 100 and the result is a much cleaner, drier, gas.

The CMV chamber 100 includes a housing body 112 with a fuel gas inlet 114 on the housing body 112. The fuel gas inlet 114 is coupled to a fuel gas source 116. A downspout 106 is coupled to the fuel gas inlet 114, and the downspout 106 directs fuel gas received from the fuel gas source 116 via the fuel gas inlet 114 into a methanol bath 104 contained within the housing body 112. A fuel gas outlet 110 is provided on the housing body 112 above a maximum level 118 of the methanol bath 104, and the fuel gas outlet 110 allows gas vapours 108 that come from the methanol bath 104 to vent out of the housing body 112.

As shown in FIGS. 1-3, the housing body 112 is a vertically positioned cylinder, and the fuel gas outlet 110 is positioned on a top end of the vertically positioned cylinder. The CMV chamber 100 further includes a drain 120 on the bottom of the housing body 112 allowing the methanol bath 104 to enter and/or exit the housing body 112. Likewise, a methanol fill port 121 is provided on the side of the housing body 112 allowing the methanol bath 104 to enter and/or exit the housing body 112. Pipe connectors 122 on each of the fuel gas inlet 114 and the fuel gas outlet 110 allow connecting to one or more external pipes 124, and insulation is provided around the external pipes 124 adjacent the housing body 112.

A method of pre-cooling fuel gas includes providing a methanol bath 104 contained within a fuel gas cooling chamber 100. The method further includes receiving incoming fuel gas from a fuel gas source 116 at a fuel gas inlet 114 on the fuel gas chamber 100, and directing the incoming fuel gas into the methanol bath 104 within the fuel gas cooling chamber 100. The method further includes directing gas vapours 108 that come from the methanol bath 104 to vent out of the fuel gas cooling chamber 100 via a fuel gas outlet 110. The fuel gas cooling chamber 100 may be shaped as a cylinder, and the method further comprises vertically positioning the cylinder and positioning the fuel gas outlet 110 on a top end of the cylinder. The method may further include providing a drain 120 on a housing body 112 of the fuel gas cooling chamber 100 to allow the methanol bath 104 to enter and exit the fuel gas cooling chamber. The method may also include connecting one or more external pipes 124 to pipe connectors 122 on each of the fuel gas inlet 114 and the fuel gas outlet 110. The method may also include installing insulation 126 around the external pipes 124 adjacent the housing body 112.

The tee 130 and bypass 132 are used during and after installation. Activating the bypass causes the fuel gas to bypass the CMV chamber 100 to service the chamber 100 without interrupting the site. A plurality of ball valves are provided in conjunction with the chamber 100 including a drain valve 134, a fill valve 136, a supply valve 138, a purge valve 140, a flow line valve 142. The purge valve 140 can be selectively moved by a user to the open position when filling the methanol 104 to avoid kick back. Likewise, the flow line valve 142 can be selectively moved by a user to the closed position to block flow and shut off the chamber when depressurizing. When the flow valve 142 is closed the line is blocked and therefore the chamber 100 is isolated.

PATENT SEARCH

There was an extensive several month search done reviewing thousands of registered patents. There appears to be nothing similar in comparison to the CMV chamber.

Although the invention has been described in connection with preferred embodiments, it should be understood that various modifications, additions and alterations may be made to the invention by one skilled in the art without departing from the spirit and scope of the invention. Functions of single modules may be separated into multiple units, or the functions of multiple modules may be combined into a single unit. All combinations and permutations of the above described features and embodiments may be utilized in conjunction with the invention.

What is claimed is:

1. A fuel gas cooling chamber comprising:
   a housing body;
   a fuel gas inlet on the housing body, the fuel gas inlet coupling to a fuel gas source;
   a downspout coupled to the fuel gas inlet, the downspout directing fuel gas received from the fuel gas source via the fuel gas inlet into a methanol bath contained within the housing body; and
   a fuel gas outlet on the housing body above a maximum level of the methanol bath, the fuel gas outlet allowing gas vapours that come from the methanol bath to vent out of the housing body.

2. The fuel gas cooling chamber of claim 1, wherein:
   the housing body is a vertically positioned cylinder; and
   the fuel gas outlet is positioned on a top end of the vertically positioned cylinder.

3. The fuel gas cooling chamber of claim 1, further comprising a drain on the housing body allowing the methanol bath to exit the housing body.

4. The fuel gas cooling chamber of claim 1, further comprising a fill port on the housing body allowing the methanol bath to enter the housing body.

5. The fuel gas cooling chamber of claim 1, further comprising pipe connectors on each of the fuel gas inlet and the fuel gas outlet for connecting to one or more external pipes.

6. The fuel gas cooling chamber of claim 5, further comprising insulation around the external pipes adjacent the housing body.

* * * * *